3,580,739
GRID ELECTRODE FOR ELECTRONIC TUBES
Gunter Ciriack, Berlin, and Georg Eckert and Horst Hofmann, Munich, Germany, assignors to Siemens Aktiengesellschaft
No Drawing. Filed Jan. 2, 1968, Ser. No. 694,804
Claims priority, application Germany, Jan. 4, 1967,
S 107,728
Int. Cl. H01j 19/38; C23b 5/50
U.S. Cl. 117—217
10 Claims

ABSTRACT OF THE DISCLOSURE

The invention is directed to electronic tubes wherein a grid electrode is constructed of any alloy containing a zirconium oxide which may be added either to the base metal forming the grid wires in amounts of 0.1 to 2% by weight or to a coating of zirconium in amounts of 10 to 50% by weight which covers the base metal.

BACKGROUND OF THE INVENTION

The invention relates to a grid electrode for electronic tubes, particularly transmission tubes, which have grid elements consisting of metal of a high melting point, such as molybdenum or tantalum, and wherein a zirconium coat is placed over the aforesaid metal.

DESCRIPTION OF THE PREFERRED EMBODIMENTS

The present invention has particularity when considered in conjunction with grid electrodes of vacuum tubes which experience high thermal loads under operating conditions. The zirconium coat applied to the grid structure is used to increase the heat radiation of the grid and for avoiding or reducing the secondary emission effects of the electron tube, and finally to obtain the desired grid effect. When operating such electron tubes under high thermal loads, the grid elements may twist or warp from their desired position to an extent sufficient to change the characteristics of the tube.

Extensive research has shown that structural changes take place within the grid electrode structure, and these changes are responsible for the deformation of the grid electrode under operation. Also by extensive research, it has been found that the grain boundary diffusion of the zirconium in the tantalum or molybdenum takes place.

According to the present invention a grid electrode is constructed so as to contain a zirconium oxide of 0.1 to 2% by weight which is added either to the base metal of the grid electrode or of 10 to 50% by weight, preferably 25% by weight, is added to the zirconium coat. By extensive experimentation it has been shown that by the addition of certain quantities zirconium oxide at the grain boundaries of the grid structure grain boundary diffusion is stopped by the zirconium itself. Therefore, this novel result greatly increases the thermal resistance of the grid structure.

According to the present invention 0.1 to 2% by weight for example of zirconium oxide is added to the original metal forming the grid wires in such a manner so that the oxide is deposited during the sintering at the grain boundaries, thereby preventing further grain boundary diffusion of the zirconium.

However, this possibility does not always exist. It frequently meets with technical difficulties as to its environment. In a further development of the method according to the present invention, the zirconium oxide is added to the prevailing zirconium coat, for example, by adding to the original suspension of 10 to 50% by weight of $ZrO_2$. This can also be accomplished by using, instead of pure zirconium powder for the application suspension, the product of a deficient (i.e., partial) reduction which already contains a large share of zirconium oxide.

Furthermore, a normal zirconium suspension may be used if the grid structure is first coated with a thin film of zirconium oxide. This is accomplished by immersing the grid, for example, into a zirconium salt solution, such as zirconium nitrate or into some zirconium alcoholate. This process would ultimately convert the zirconium salt or zirconium alcoholate into a zirconium oxide film during a subsequent annealing treatment.

Accordingly, the present invention has provided a new and novel method of constructing grid electrodes for electron tubes which structure greatly increases the thermal resistance of the grid structure thereby providing electron tubes having more stable characteristics under large thermal loads. It will be understood that variations and modifications may be effected without departing from the spirit and scope of the novel concepts of this invention.

We claim:
1. A grid electrode structure for electron tubes consisting of grains of a high melting metal sintered to form a grid wire, a coating of zirconium on said wire and a substantially homogeneous interspersion of zirconium oxide at the grain boundaries of said wire.
2. A grid electrode structure as defined in claim 1 wherein the zirconium oxide is present in amounts ranging from 0.1 to 2% by weight.
3. A grid electrode structure as defined in claim 1 wherein the zirconium oxide is present in amounts ranging from 10 to 50% by weight.
4. A grid electrode structure as defined in claim 1 wherein the zirconium oxide is present in an amount of about 25% by weight.
5. A method of producing a grid electrode structure having a high thermal resistance for use in electron tubes comprising providing grains of a high melting metal, sintering said grains to form a grid wire, substantially homogenously interspersing discrete particles of zirconium oxide at boundaries of said grains and coating said wire with a layer of zirconium.
6. A method as defined in claim 5 wherein the interspersing includes subjecting the high melting metal, the zirconium oxide and the zirconium to sintering conditions.
7. A method as defined in claim 5 wherein the discrete particles of zirconium oxide are intermixed with the grains of high melting metal prior to interspersing in amounts ranging from 0.1 to 2% by weight.
8. A method as defined in claim 5 wherein the discrete particles of zirconium oxide are intermixed with zirconium prior to interspersing in amounts ranging from 10 to 50% by weight.
9. A method as defined in claim 8 wherein the amount of zirconium oxide particles is about 25% by weight.
10. A method as defined in claim 8 wherein the intermixture of zirconium oxide and zirconium is a product of a partial reduction of zirconium oxide and contains 10 to 50% by weight of zirconium oxide.

References Cited

UNITED STATES PATENTS

| 2,536,673 | 1/1951 | Widell | 117—221 |
| 2,805,965 | 9/1957 | Robinson | 117—221 |

FOREIGN PATENTS

| 943,278 | 12/1963 | England | 117—221 |

WILLIAM L. JARVIS, Primary Examiner

U.S. Cl. X.R.

117—215,221,230; 313—107, 345